United States Patent
Albertson et al.

(10) Patent No.: US 7,757,657 B2
(45) Date of Patent: Jul. 20, 2010

(54) DUAL ACTIVE FUEL MANAGEMENT SEQUENCING

(75) Inventors: William C. Albertson, Clinton Township, MI (US); Mark Stabinsky, Troy, MI (US)

(73) Assignee: GM Global Technology Operations, Inc.

(*) Notice: Subject to any disclaimer, the term of this patent is extended or adjusted under 35 U.S.C. 154(b) by 16 days.

(21) Appl. No.: 12/235,809

(22) Filed: Sep. 23, 2008

(65) Prior Publication Data

US 2010/0063713 A1  Mar. 11, 2010

Related U.S. Application Data

(60) Provisional application No. 61/095,988, filed on Sep. 11, 2008.

(51) Int. Cl.
*F02D 13/06* (2006.01)
(52) U.S. Cl. .................... 123/198 F; 123/481
(58) Field of Classification Search ............. 123/198 F, 123/481
See application file for complete search history.

(56) References Cited

U.S. PATENT DOCUMENTS

| | | | | |
|---|---|---|---|---|
| 4,133,332 A * | 1/1979 | Benson et al. | ........... | 123/198 F |
| 4,173,209 A * | 11/1979 | Jordan | ........... | 123/198 F |
| 4,175,534 A * | 11/1979 | Jordan | ........... | 123/198 F |
| 4,386,590 A * | 6/1983 | Bates | ........... | 123/198 F |
| 5,408,966 A * | 4/1995 | Lipinski et al. | ........... | 123/198 F |
| 5,490,486 A * | 2/1996 | Diggs | ........... | 123/198 F |
| 6,752,121 B2 * | 6/2004 | Rayl et al. | ........... | 123/198 F |
| 2007/0215106 A1 * | 9/2007 | Petridis et al. | ........... | 123/347 |
| 2009/0000579 A1 * | 1/2009 | Rozario et al. | ........... | 123/90.1 |
| 2009/0066337 A1 * | 3/2009 | Gibson et al. | ........... | 324/378 |
| 2009/0107432 A1 * | 4/2009 | McConville et al. | ........... | 123/90.17 |

* cited by examiner

*Primary Examiner*—Thomas N Moulis

(57) ABSTRACT

A system includes a cylinder selection module and a valve deactivation module. The cylinder selection module selects cylinders of an engine for active fuel management. The valve deactivation module deactivates intake valves of selected cylinders of the engine before deactivating exhaust valves of the selected cylinders when an engine speed of the engine is less than or equal to a predetermined speed.

13 Claims, 3 Drawing Sheets

DUAL ACTIVE FUEL MANAGEMENT SEQUENCING

CROSS-REFERENCE TO RELATED APPLICATIONS

This application claims the benefit of U.S. Provisional Application No. 61/095,988, filed on Sep. 11, 2008. The disclosure of the above application is incorporated herein by reference.

FIELD

The present disclosure relates to engine control systems, and more particularly to active fuel management at different driving speeds.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an internal combustion engine 100 (hereinafter engine 100) is shown. A control module 104 controls the operation of the engine 100. The control module 104 may also control a transmission 108. The control module 104 may receive driver input from an accelerator input module 110 and from a transmission input module 112. The driver input may indicate an amount of torque requested or demanded.

The accelerator input module 110 may include an accelerator pedal and pedal position sensors (both not shown). The pedal position sensors may sense a rate of change of the accelerator pedal. The accelerator input module 110 may determine the amount of torque requested or demanded based on the rate of change of the accelerator pedal. The transmission input module 112 may include a gearshift lever, gearshift paddles, and/or gearshift buttons (all not shown).

Based on the driver input, the control module 104 controls a throttle valve 116. The throttle valve 116 regulates air intake into an intake manifold 118 of the engine 100. The position of the throttle valve 116 may be measured by a throttle position sensor 120. The amount of air flowing into the intake manifold 118 may be measured by a mass air flow (MAF) sensor 122. The pressure inside the intake manifold 118 may be measured by a manifold absolute pressure (MAP) sensor 124. Air from the intake manifold 118 is combined with fuel to create an air-fuel mixture in one or more cylinders 126. Eight cylinders 126-1, 126-2, . . . , and 126-8 (collectively cylinders 126) are shown for example only. The engine 100 may comprise additional or fewer cylinders.

Combusting the air-fuel mixture in the cylinders 126 produces torque that turns a crankshaft (not shown). The crankshaft is coupled to the transmission 108 via a torque transmitting device 130. The torque transmitting device 130 may include a torque converter or a clutch. A revolutions-per-minute (RPM) sensor 132 may measure the speed of the crankshaft. The speed of the crankshaft represents the speed of the engine 100 (i.e., an engine speed).

Depending on the torque demand indicated by the driver input, the control module 104 may deactivate and reactivate one or more of the cylinders 126. When maximum torque is not required, the control module 104 may deactivate one or more of the cylinders 126 to improve fuel economy. For example, the cylinders 126 shown shaded (e.g., cylinders 126-1, etc.; hereinafter selected cylinders) may be deactivated. Subsequently, when the driver input indicates that an additional torque is demanded, the control module 104 reactivates the selected cylinders.

The control module 104 may deactivate and reactivate the selected cylinders in different ways. For example only, the control module 104 may operate a lifter oil manifold assembly (LOMA) 134 comprising solenoid-actuated oil control valves (OCVs) (not shown) that deactivate and reactivate the selected cylinders in response to the control module 104.

Each of the cylinders 126 receives air through an intake valve and outputs exhaust gases generated by combustion through an exhaust valve (both not shown). The intake and exhaust valves of the cylinders 126 may be actuated by rocker arms via pushrods driven off a camshaft (all not shown). The pushrods may include hydraulically-controlled switchable lost motion devices (SLMDs) (not shown).

To deactivate the selected cylinders, the OCVs send hydraulic signals to the SLMDs corresponding to the selected cylinders. Actuating the SLMDs decouples the rocker arms from the camshaft and closes the intake and exhaust valves of the selected cylinders. When the intake and exhaust valves of the selected cylinders are closed, the selected cylinders are deactivated. Subsequently, based on the torque demand, the OCVs may reactivate the selected cylinders by enabling the corresponding SLMDs and reopening the intake and exhaust valves of the selected cylinders.

SUMMARY

A system comprises a cylinder selection module and a valve deactivation module. The cylinder selection module selects cylinders of an engine for active fuel management. The valve deactivation module deactivates intake valves of selected cylinders of the engine before deactivating exhaust valves of the selected cylinders when an engine speed of the engine is less than or equal to a predetermined speed. The valve deactivation module deactivates the exhaust valves before deactivating the intake valves when the engine speed is greater than the predetermined speed.

The system further comprises a torque request monitoring module and a valve activation module. The torque request monitoring module monitors a requested torque. The valve activation module activates the intake valves deactivated by the deactivation module before activating the exhaust valves deactivated by the deactivation module when the requested torque is greater than or equal to a predetermined torque and when the engine speed is less than or equal to the predetermined speed. The valve activation module activates the exhaust valves deactivated by the deactivation module before activating the intake valves deactivated by the deactivation module when the requested torque is greater than or equal to the predetermined torque and when the engine speed is greater than the predetermined speed.

A method comprises selecting cylinders of an engine for active fuel management, and deactivating intake valves of selected cylinders of the engine before deactivating exhaust valves of the selected cylinders when an engine speed of the engine is less than or equal to a predetermined speed. The method further comprises deactivating the exhaust valves before deactivating the intake valves when the engine speed is greater than the predetermined speed.

The method further comprises monitoring a requested torque, and activating deactivated ones of the intake valves before activating deactivated ones of the exhaust valves when the requested torque is greater than or equal to a predetermined torque and when the engine speed is less than or equal to the predetermined speed. The method further comprising activating deactivated ones of the exhaust valves before activating deactivated ones of the intake valves when the requested torque is greater than or equal to the predetermined torque and when the engine speed is greater than the predetermined speed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
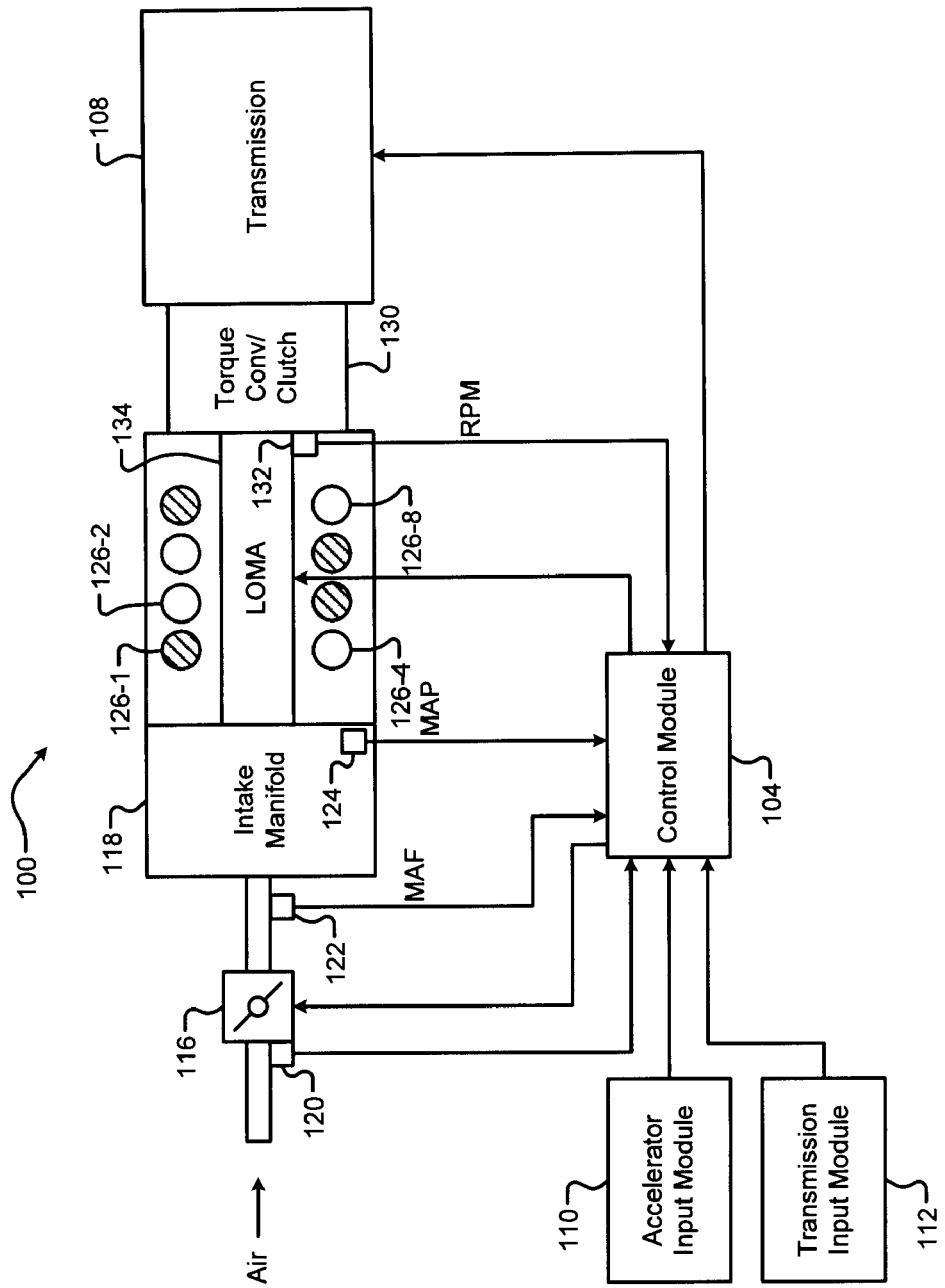
FIG. 1 is a functional block diagram of an engine control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Engines having multiple cylinders may use an active fuel management system that utilizes an active fuel management sequence to deactivate and reactivate selected cylinders to increase fuel efficiency. Presently, the active fuel management sequence includes a deactivation sequence to deactivate the selected cylinders and a reactivation sequence to reactivate the selected cylinders. The presently used (i.e., conventional) active fuel management sequence is described below.

Normally, in engines having four-stroke cycles, the cylinders intake a charge during an intake stroke. The cylinders compress the charge during a compression stroke. The cylinders combust the charge during an expansion stroke. Finally, the cylinders exhaust the combusted charge during an exhaust stroke, and the four-stroke cycle is repeated.

Presently, the deactivation sequence begins by first deactivating the exhaust valves of the selected cylinders when the charge is combusted during the expansion stroke. Since the exhaust valves are closed, the combusted charge does not exit the selected cylinders during the exhaust stroke. Subsequently, the intake valves of the selected cylinders are deactivated. Since the exhaust and intake valves are closed, the combusted charge is trapped in the selected cylinders. The selected cylinders compress and expand the trapped charge while the selected cylinders remain deactivated. Compressing the trapped charge having a relatively high pressure/temperature often generates undesirable levels of noise, vibration, and harshness (NVH).

The reactivation sequence begins when the driver input indicates a torque demand that is greater than the torque that can be output by the active cylinders. Based on the torque demand, the exhaust valves of the deactivated cylinders are reactivated first. The trapped charge is exhausted during the exhaust stroke of the reactivated cylinders. Subsequently, the intake valves of the reactivated cylinders are activated. The reactivated cylinders intake a fresh charge during the intake stroke. The reactivated cylinders compress the fresh charge during the compression stroke. The reactivated cylinders combust the fresh charge during the expansion stroke. Only then the additional torque output by the reactivated cylinders can be delivered to the torque transmitting device.

The present disclosure relates to providing a dual active fuel management sequence. The dual active fuel management sequence comprises a first sequence that is used to deactivate and reactivate the selected cylinders when the engine speed is less than or equal to a predetermined speed and a second sequence that is used when the engine speed is greater than the predetermined speed.

Specifically, the first sequence is used at low engine speeds. For example only, the first sequence is used when the engine speed is less than or equal to 1200 revolutions-per-minute (RPM). Unlike the conventional deactivation sequence, the first sequence comprises a first deactivation sequence and a first reactivation sequence. The first deactivation sequence first deactivates the intake valves of the selected cylinders instead of deactivating the exhaust valves first. Since the exhaust valves are not deactivated first, a substantial amount of the combusted charge exits the selected cylinders during the exhaust stroke. The intake valves of the selected cylinders are deactivated after the combusted charge exits the selected cylinders during the exhaust stroke. Thus, no fresh charge intake occurs after the combusted charge exits the selected cylinders. Thereafter, the exhaust valves of the selected cylinders are deactivated. Accordingly, only a small amount of the combusted charge is trapped in the deactivated cylinders.

The deactivated cylinders compress and expand the small amount of trapped charge having a relatively low mass and low pressure/temperature while the selected cylinders are deactivated. The low mass of the trapped charge cools quickly. On reactivation, the selected cylinders output a relatively steady and low additional torque. The amplitudes of the torque excursions at deactivation/reactivation transitions are reduced. Accordingly, the undesirable levels of NVH are reduced.

The first reactivation sequence begins when the driver input indicates that an additional torque is demanded. The driver input indicates that the additional torque is demanded when the rate of change of the accelerator pedal is greater than or equal to a predetermined rate. During the first reactivation sequence, unlike the conventional reactivation sequence, the intake valves of the deactivated cylinders are reactivated first instead of the exhaust valves. Activating the intake valves first allows the reactivated cylinders to intake the fresh charge without first waiting for the trapped charge to exit the reactivated cylinders. Accordingly, the additional torque output by the reactivated cylinders is delivered quickly to the torque transmitting device.

Low engine speeds provide sufficient time to first deactivate and reactivate the intake valves. Additionally, since the charge trapped in the deactivated cylinders during the first sequence has relatively low pressure/temperature, the intake valves of the deactivated cylinders can be safely reactivated without first activating the exhaust valves.

The second sequence is used at higher engine speeds. For example only, the second sequence is used when the engine speed is greater than 1200 RPM. The second sequence includes a second deactivation sequence and a second reactivation sequence. The second deactivation sequence and the second reactivation sequence are the same as the conventional deactivation and reactivation sequences. In other words, during the second deactivation and reactivation sequences, the exhaust valves of the selected cylinders are deactivated and reactivated first (i.e., before the intake valves), respectively.

Figure 2:
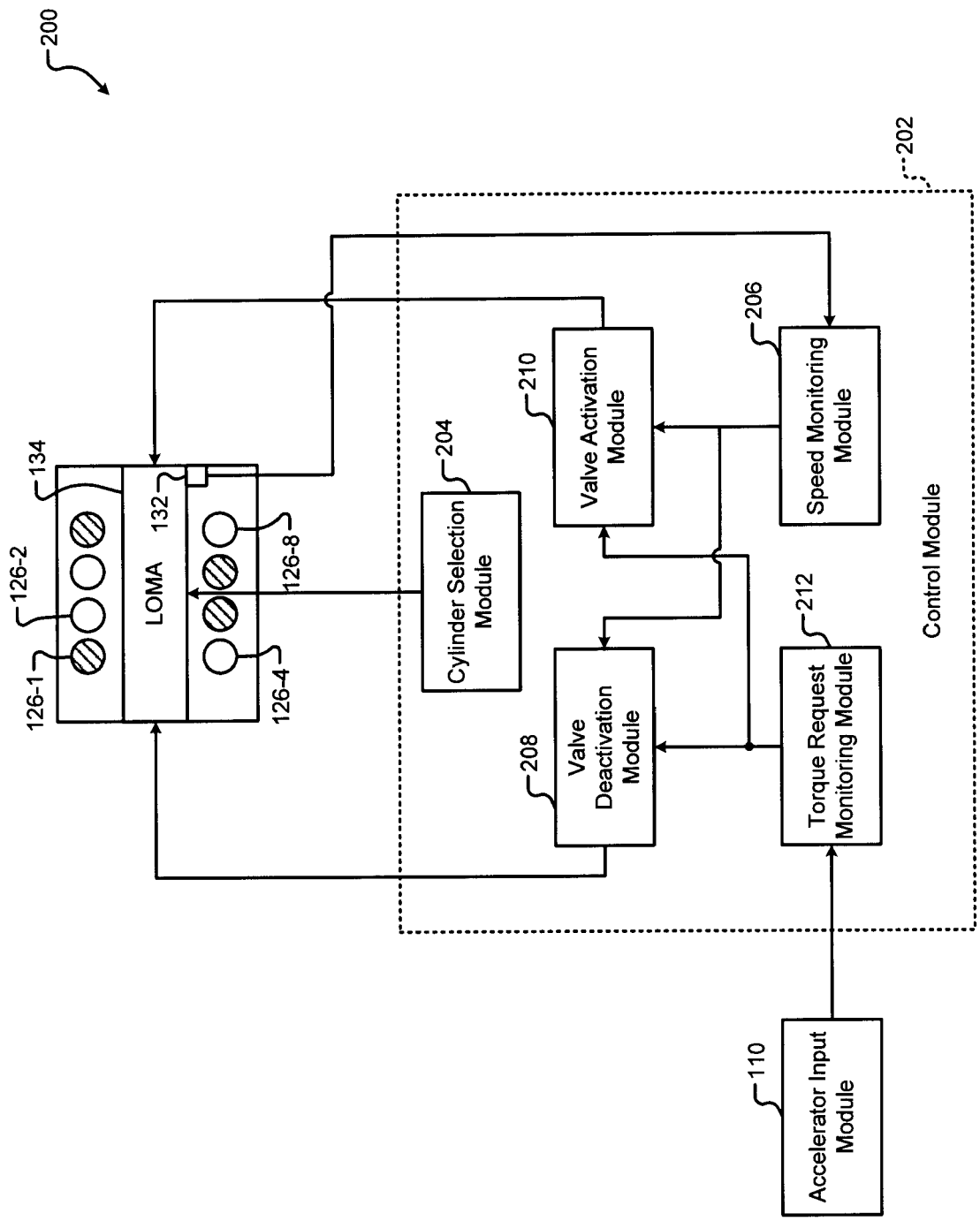
FIG. 2 is a functional block diagram of an exemplary engine control module that utilizes dual active fuel management sequencing according to the present disclosure.

Referring now to FIG. 2, a functional block diagram of an exemplary active fuel management system 200 having the dual active fuel management sequence according to the present disclosure is shown. To simplify discussion, only a pertinent portion of the engine 100 is shown. The active fuel management system 200 comprises a control module 202. The control module 202 comprises a cylinder selection module 204, a speed monitoring module 206, a valve deactivation module 208, a valve activation module 210, and a torque request monitoring module 212.

The cylinder selection module 204 enables active fuel management and selects cylinders for active fuel management when active fuel management is enabled. Specifically, the cylinder selection module 204 selects cylinders that are deactivated and reactivated during the first and second deactivation and reactivation sequences. For example only, when the engine 100 includes eight cylinders, the cylinder selection module 204 may select cylinders 126-1, 126-4, 126-6, and 126-7 (hereinafter selected cylinders) for deactivation. For example only, solenoid-actuated oil control valves (OCVs) that are integral to the lifter oil manifold assembly (LOMA) 134 or a suitable module may deactivate and reactivate the selected cylinders. Specifically, the LOMA 134 or the suitable module may deactivate and reactivate the intake and exhaust valves of the selected cylinders based on inputs received from the valve deactivation module 208 and the valve activation module 210, respectively.

The speed monitoring module 206 monitors the engine speed based on inputs received from the RPM sensor 132. The speed monitoring module 206 indicates to the valve deactivation and activation modules 208, 210 when the engine speed is less than or equal to the predetermined speed and when the engine speed is greater than the predetermined speed.

When the engine speed is less than or equal to the predetermined speed, the valve deactivation module 208 generates and outputs first valve deactivation signals. The first valve deactivation signals include signals that first deactivate the intake valves of the selected cylinders and then deactivate the exhaust valves of the selected cylinders.

The torque request monitoring module 212 receives inputs from the accelerator input module 110 that indicate the torque requested by the driver input. The torque request monitoring module 212 determines when the torque requested is greater than or equal to a predetermined torque and when the torque requested is less than the predetermined torque.

When the engine speed is less than or equal to the predetermined speed and when the torque requested is greater than or equal to the predetermined torque, the valve activation module 210 generates and outputs first valve reactivation signals. The first valve reactivation signals include signals that first reactivate the intake valves of the selected cylinders and then reactivate the exhaust valves of the selected cylinders.

On the other hand, when the engine speed is greater than the predetermined speed, the valve deactivation module 208 generates and outputs second valve deactivation signals. The second valve deactivation signals include signals that first deactivate the exhaust valves of the selected cylinders and then deactivate the intake valves of the selected cylinders. Additionally, when the engine speed is greater than the predetermined speed and when the torque requested is greater than or equal to the predetermined torque, the valve activation module 210 generates and outputs second valve reactivation signals. The second valve reactivation signals include signals that first reactivate the exhaust valves of the selected cylinders and then reactivate the intake valves of the selected cylinders.

Figure 3:
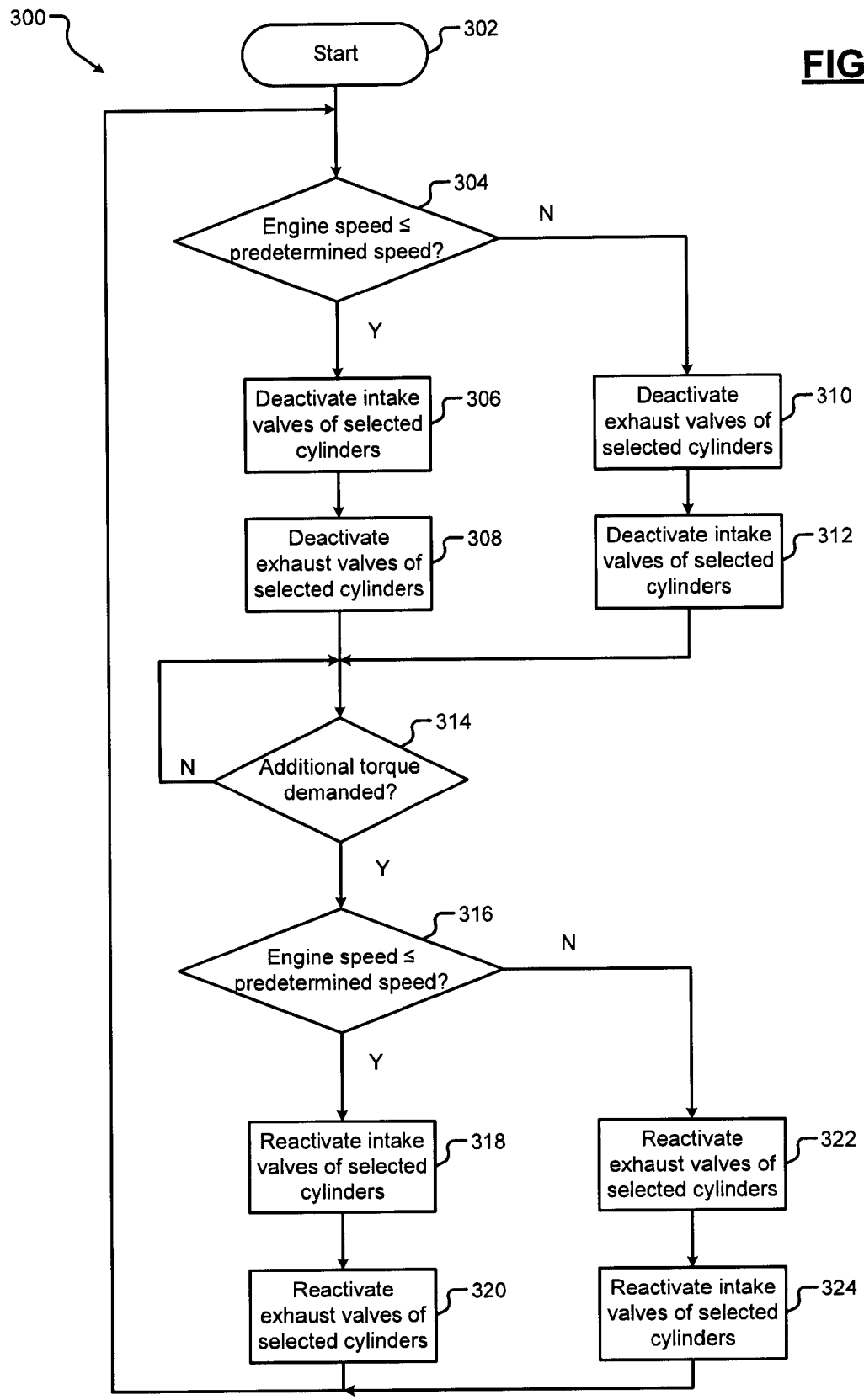
FIG. 3 is a flowchart that depicts steps of an exemplary method for implementing dual active fuel management sequencing in engines according to the present disclosure.

Referring now to FIG. 3, a flowchart shows steps of a method 300 for implementing the dual active fuel management sequencing according to the present disclosure. Control begins at step 302. Control determines in step 304 whether the engine speed is less than or equal to the predetermined speed.

If the result of step 304 is true, control deactivates the intake valves of the selected cylinders in step 306. Control deactivates the exhaust valves of the selected cylinders in step 308. If, however, the result of step 304 is false, control deactivates the exhaust valves of the selected cylinders in step 310. Control deactivates the intake valves of the selected cylinders in step 312.

At the end of steps 308 and 312, control determines in step 314 whether additional torque is demanded. Control waits if the result of step 314 is false. If the result of step 314 is true, control determines in step 316 whether the engine speed is less than or equal to the predetermined speed.

If the result of step 316 is true, control reactivates the intake valves of the selected cylinders in step 318. Control reactivates the exhaust valves of the selected cylinders in step 320. Control returns to step 304.

If, however, the result of step 316 is false, control reactivates the exhaust valves of the selected cylinders in step 322. Control reactivates the intake valves of the selected cylinders in step 324. Control returns to step 304.

Using the dual active fuel management sequence may provide many benefits in addition to those listed above. For example, fuel economy may be improved. The undesirable levels of NVH may be reduced. The torque output by the reactivated cylinders may be quickly delivered to the torque transmitting device. Torque converter clutch (TCC) slip at active fuel management transitions may be reduced. Active fuel management operation at low engine speeds may be increased. Active fuel management switching hysteresis may be reduced. Throttle response at low engine speeds may be increased due to faster reactivation of the selected cylinders, etc.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a cylinder selection module that selects cylinders of an engine for active fuel management;
   a valve deactivation module that deactivates intake valves of selected cylinders of said engine before deactivating exhaust valves of said selected cylinders when an engine speed of said engine is less than or equal to a predetermined speed, a torque request monitoring module that monitors a requested torque; and a valve activation module that activates said exhaust valves deactivated by said deactivation module before activating said intake valves deactivated by said deactivation module when said requested torque is greater than or equal to said predetermined torque and when said engine speed is greater than said predetermined speed.

2. The system of claim 1 wherein said predetermined speed includes a speed of 1200 revolutions-per-minute (RPM).

3. The system of claim 1 wherein:

the valve activation module activates said intake valves deactivated by said deactivation module before activating said exhaust valves deactivated by said deactivation module when said requested torque is greater than or equal to a predetermined torque and when said engine speed is less than or equal to said predetermined speed.

4. The system of claim 1 wherein said valve deactivation module deactivates said exhaust valves before deactivating said intake valves when said engine speed is greater than said predetermined speed.

5. The system of claim 1 further comprising an accelerator input module that measures a rate of change of an accelerator pedal and that outputs said requested torque based on said rate of change of said accelerator pedal.

6. The system of claim 1 further comprising a speed monitoring module that monitors said engine speed, that indicates when said engine speed is less than or equal to said predetermined speed, and that indicates when said engine speed is greater than said predetermined speed.

7. The system of claim 1 further comprising a speed sensor that senses said engine speed.

8. A method comprising:

selecting cylinders of an engine for active fuel management;

deactivating intake valves of selected cylinders of said engine before deactivating exhaust valves of said selected cylinders when an engine speed of said engine is less than or equal to a predetermined speed;

monitoring a requested torque; and activating deactivated ones of said exhaust valves before activating deactivated ones of said intake valves when said requested torque is greater than or equal to said predetermined torque and when said engine speed is greater than said predetermined speed.

9. The method of claim 8 further comprising selecting a speed of 1200 revolutions-per-minute (RPM) as said predetermined speed.

10. The method of claim 8 further comprising:

activating deactivated ones of said intake valves before activating deactivated ones of said exhaust valves when said requested torque is greater than or equal to a predetermined torque and when said engine speed is less than or equal to said predetermined speed.

11. The method of claim 8 further comprising deactivating said exhaust valves before deactivating said intake valves when said engine speed is greater than said predetermined speed.

12. The method of claim 8 further comprising:

measuring a rate of change of an accelerator pedal; and outputting said requested torque based on said rate of change of said accelerator pedal.

13. The method of claim 8 further comprising:

sensing said engine speed;

monitoring said engine speed;

indicating when said engine speed is less than or equal to said predetermined speed; and indicating when said engine speed is greater than said predetermined speed.

* * * * *